US012774168B2

(12) United States Patent
Kim et al.

(10) Patent No.: US 12,774,168 B2
(45) Date of Patent: Oct. 27, 2026

(54) APPARATUS FOR DISCHARGING POWDER OF SECONDARY BATTERY

(71) Applicant: SK On Co., Ltd., Seoul (KR)

(72) Inventors: In Mok Kim, Daejeon (KR); Moo Jin Park, Daejeon (KR)

(73) Assignee: SK ON CO., LTD., Seoul (KR)

(*) Notice: Subject to any disclaimer, the term of this patent is extended or adjusted under 35 U.S.C. 154(b) by 145 days.

(21) Appl. No.: 18/791,438

(22) Filed: Aug. 1, 2024

(65) Prior Publication Data

US 2025/0058976 A1 Feb. 20, 2025

(30) Foreign Application Priority Data

Aug. 18, 2023 (KR) ........................ 10-2023-0108125

(51) Int. Cl.

| | |
|---|---|
| ***B65G 33/26*** | (2006.01) |
| ***B01F 27/112*** | (2022.01) |
| ***B01F 35/71*** | (2022.01) |
| ***B65G 65/48*** | (2006.01) |
| ***H01M 10/42*** | (2006.01) |

(52) U.S. Cl.

CPC .......... *B65G 33/265* (2013.01); *B01F 27/112* (2022.01); *B01F 35/71775* (2022.01); *B65G 65/4881* (2013.01); *B65G 2201/042* (2013.01); *H01M 10/42* (2013.01)

(58) Field of Classification Search

CPC .......... B65G 65/4881; B65G 2201/042; B65G 33/265; B65G 65/46; B65G 65/48; H01H 10/42; B01F 35/39; B01F 35/71775; B01F 35/71731; B01F 27/112

USPC .......................................................... 222/135

See application file for complete search history.

(56) References Cited

U.S. PATENT DOCUMENTS 3,653,639 A * 4/1972 Mueller ................ B01F 33/403 406/137
3,710,983 A * 1/1973 Ricciardi ............ B01F 27/1142 222/141
5,314,090 A * 5/1994 Alexander .............. B05B 7/144 222/196
2012/0024996 A1* 2/2012 Bongratz ................ B02C 18/24 241/101.5

FOREIGN PATENT DOCUMENTS

JP H8-133474 A 5/1996
KR 10-0654840 B1 12/2006

(Continued)

OTHER PUBLICATIONS

Office Action for Korean Patent Application No. 10-2023-0108125 issued by the Korean Patent Office on Apr. 11, 2025.

*Primary Examiner* — David J Walczak
(74) *Attorney, Agent, or Firm* — IP&T GROUP LLP

(57) ABSTRACT

An apparatus for discharging powder of a secondary battery includes a hopper having an accommodating space in which powder is accommodated and a discharge port through which the powder is discharged, a drive shaft at least partially disposed inside the hopper and having a shape extending in a first direction, a drive motor connected to the drive shaft and rotating the drive shaft, and a spiral blade connected to a circumferential surface of the drive shaft, wherein the spiral blade includes a first blade and a second blade having different radii.

13 Claims, 6 Drawing Sheets

(56) References Cited

FOREIGN PATENT DOCUMENTS

| | | | |
|---|---|---|---|
| KR | 10-1749969 | B1 | 7/2017 |
| KR | 10-2243729 | B1 | 4/2021 |
| KR | 10-2021-0071409 | A | 6/2021 |
| KR | 10-2023-0087649 | A | 6/2023 |

* cited by examiner

APPARATUS FOR DISCHARGING POWDER OF SECONDARY BATTERY

CROSS-REFERENCE TO RELATED APPLICATIONS

This patent document claims the priority and benefits of Korean Patent Application No. 10-2023-0108125 filed on Aug. 18, 2023, the disclosure of which is incorporated herein by reference in its entirety.

TECHNICAL FIELD

The disclosure and implementations disclosed in this patent document generally relate to an apparatus for discharging powder for a secondary battery.

BACKGROUND

Unlike primary batteries, secondary batteries may be conveniently charged and discharged and thus have come to prominence as a power source for various mobile devices and electric vehicles. For example, a battery module may be formed by connecting a plurality of secondary batteries using a non-aqueous electrolyte with high energy density and may be used as a power source for an electric vehicle.

Lead secondary batteries, nickel cadmium secondary batteries, nickel hydride secondary batteries, and lithium ion secondary batteries have mainly been used as secondary batteries. Thereamong, lithium-ion secondary batteries are small and lightweight, have high energy density, and have excellent high-current load characteristics.

Lithium ion secondary batteries use lithium salts, such as lithium cobaltate, as a positive electrode active material, and use carbonaceous materials, such as graphite, as a negative electrode active material. Particulate graphite-based materials have been mainly used as carbon materials comprising negative electrodes of lithium-ion secondary batteries, and here, graphite has been mixed therewith to ensure both cost and structural stability.

In the related art, graphite has been introduced into a mixing device using a hopper. Due to the nature of graphite, graphite may cluster, and clustering of graphite may be more severe near a discharge port. If clustering of graphite is severe, powder may not be able to be input into the mixing device or the speed at which powder is introduced may be reduced, which may be problematic.

SUMMARY

The present disclosure may be implemented in some embodiments to provide an apparatus for discharging powder of a secondary battery, capable of reducing clustering of powder.

The present disclosure may be implemented in some embodiments to provide an apparatus for discharging powder of a secondary battery, capable of smoothly discharging powder.

In some embodiments of the present disclosure, an apparatus for discharging powder of a secondary battery includes: a hopper having an accommodating space in which powder is accommodated and a discharge port through which the powder is discharged; a drive shaft at least partially disposed inside the hopper and having a shape extending in a first direction; a drive motor connected to the drive shaft and rotating the drive shaft; and a spiral blade connected to a circumferential surface of the drive shaft, wherein the spiral blade includes a first blade and a second blade having different radii.

The first blade may be disposed in a position opposite the discharge port, and the second blade may be disposed on at least one of both ends of the spiral blade in the first direction.

The spiral blade may be disposed to be spaced apart from an internal surface of the hopper so that a blade tip does not contact the internal surface of the hopper.

The radius of the first blade may be greater than the radius of the second blade.

The spiral blade may further include a third blade disposed between the first blade and the second blade.

A radius of the third blade may be smaller than the radius of the first blade and larger than the radius of the second blade.

The first blade and the second blade may be provided in plural, and the radius of the first blade may be greater than the radius of the second blade.

The first blade may be disposed between the second blades.

An inclined portion may be formed on a lower surface of the hopper, and the discharge port may be formed in a lower portion of the inclined portion.

The drive shaft may be in contact with the inclined portion.

The radius of the first blade may be equal to twice or more the radius of the second blade.

The apparatus may further include a vibration unit contacting the inclined portion and transmitting vibrations to the hopper.

A valve which is opened and closed may be connected to the discharge port.

In some embodiments of the present disclosure, an apparatus for discharging powder of a secondary battery includes: a hopper having an accommodating space in which powder is accommodated and a discharge port through which the powder is discharged, the discharge port being formed at a bottom; a drive shaft at least partially disposed inside the hopper and having a shape extending in a first direction; a drive motor connected to the drive shaft and rotating the drive shaft; and a plurality of screw members connected to a circumferential surface of the drive shaft and extending outwardly in a radial direction of the drive shaft, wherein at least a portion of the plurality of screw members are disposed in a position opposite to the discharge port.

The plurality of screw members may respectively include a flange portion formed at one end thereof.

The flange portion may have a shape extending in the first direction.

The plurality of screw members may include a first screw member disposed in a position opposite to the discharge port and a second screw member disposed on at least one of both ends of the plurality of screw members in the first direction, and a length of the first screw member may be greater than a length of the second screw member.

BRIEF DESCRIPTION OF DRAWINGS

Certain aspects, features, and advantages of the present disclosure are illustrated by the following detailed description with reference to the accompanying drawings.

DETAILED DESCRIPTION

Figure 1:
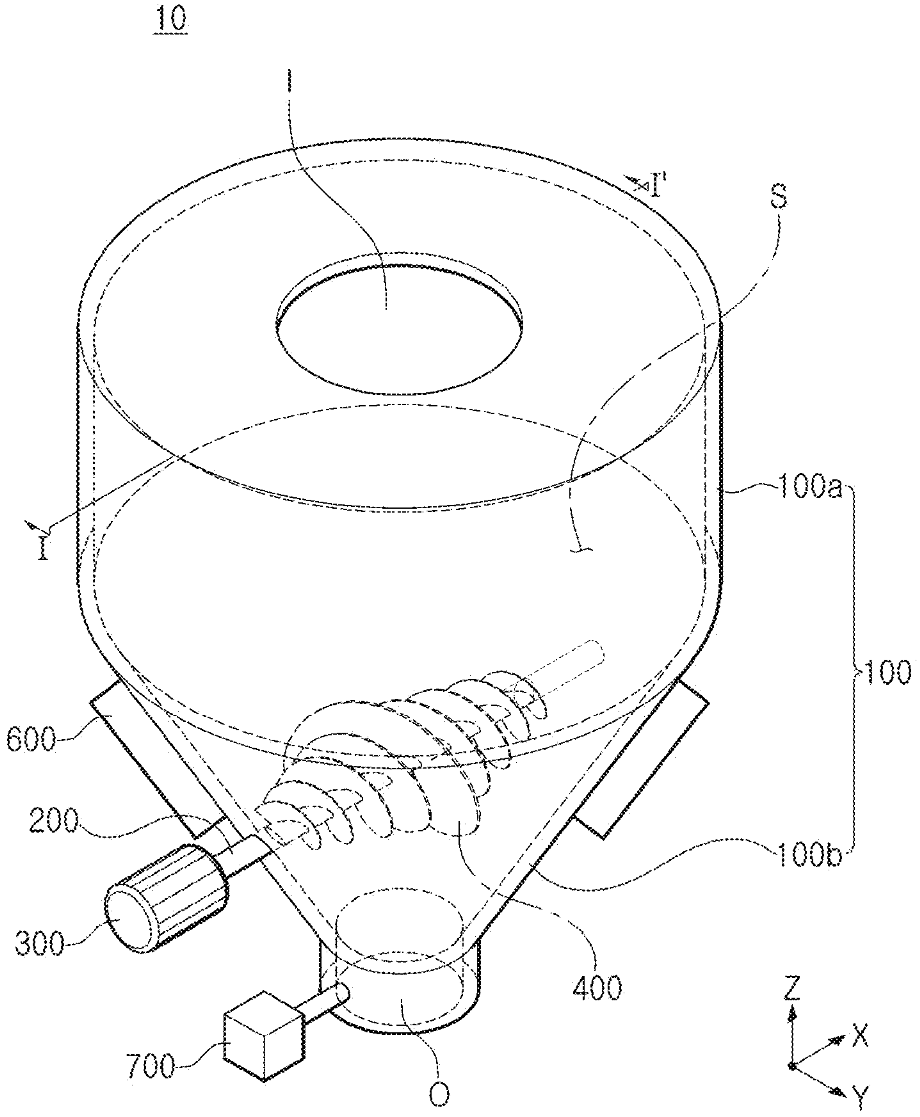
FIG. 1 is a perspective view of an apparatus for discharging powder of a secondary battery according to an embodiment of the present disclosure.

Prior to the description of the present disclosure, terms and words used in the present specification and claims to be described below should not be construed as limited to ordinary or dictionary terms, and should be construed in accordance with the technical idea of the present disclosure based on the principle that the inventors may properly define their own inventions in terms of terms in order to best explain the invention. Therefore, the embodiments described in the present specification and the configurations illustrated in the drawings are merely the most preferred embodiments of the present disclosure and are not intended to represent all of the technical ideas of the present disclosure, and thus should be understood that various equivalents and modifications may be substituted at the time of the present application.

As used herein, the singular forms are intended to include the plural forms as well, unless the context clearly indicates otherwise. It will be further understood that the terms "comprises," "comprising," etc. when used in this specification, specify the presence of stated features, integers, steps, operations, elements, and/or components, but do not preclude the presence or addition of one or more other features, integers, steps, operations, elements, components, and/or groups thereof.

In addition, in the present specification, the expressions, such as an upper side, a lower side, a side face, a rear surface, and the like, are described based on the drawings and may be expressed differently when the direction of the corresponding object is changed.

The terms including ordinal numbers, such as 'first', 'second', etc. may be used herein to distinguish elements from one another. These ordinal numbers are merely used to distinguish the same or similar elements from one another, and meanings of the terms are not construed as being limited by the using of the ordinal numbers. For example, use orders or arrangement orders of elements combined with these ordinal numbers are not limited by numbers thereof. The ordinal numbers may be redisposed with one another.

Exemplary embodiments of the present disclosure will now be described in detail with reference to the accompanying drawings. However, the ideas of the present disclosure are not limited thereto and those skilled in the art who understand the ideas of the present disclosure may easily propose any other embodiments within the scope of the present disclosure and any other degenerative invention through addition, change, deletion, and the like, and those embodiments will also be within the scope of the present disclosure. Thus, in the drawings, the shapes and dimensions of elements may be exaggerated for clarity.

Figure 2:
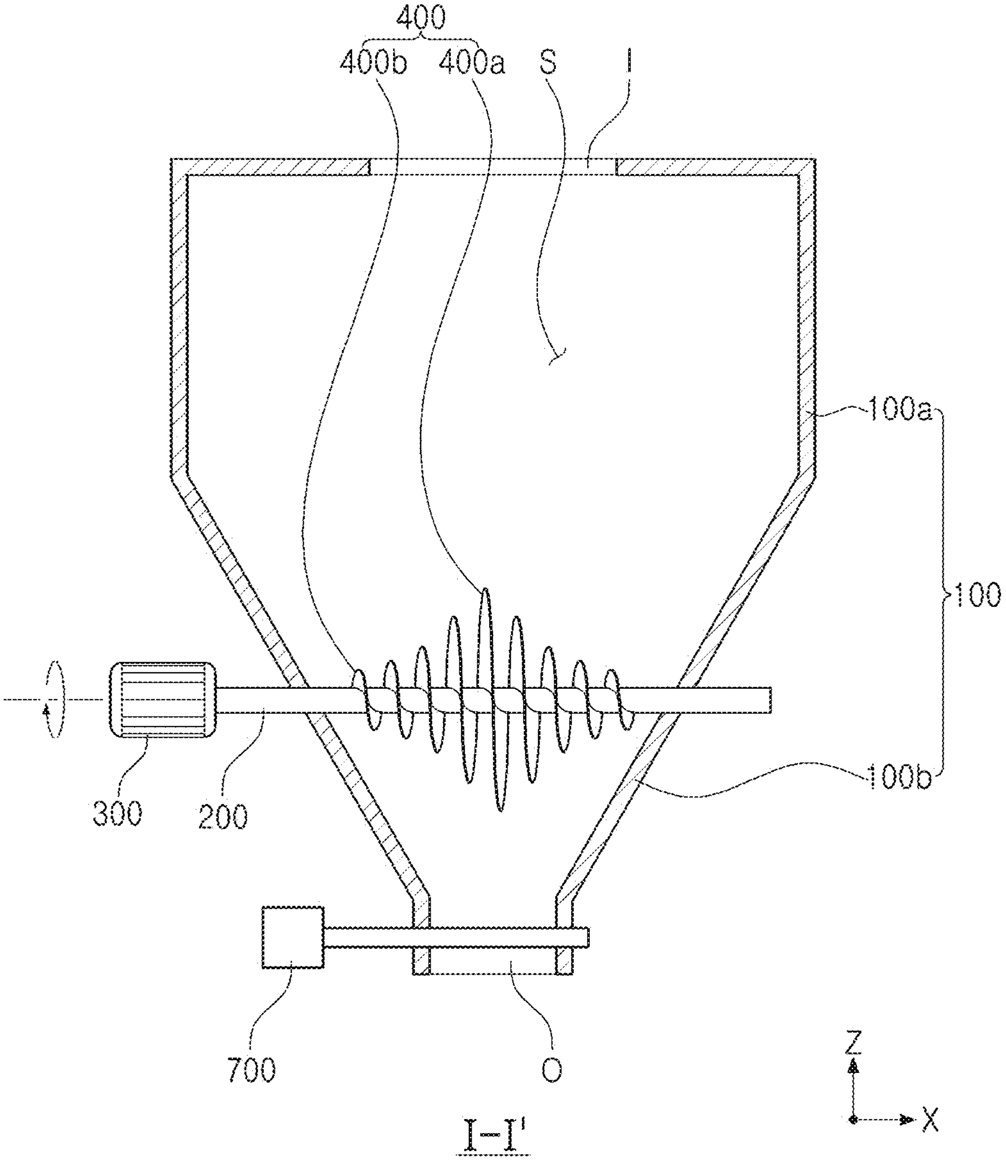
FIG. 2 is a cross-sectional view taken along line I-I' of FIG. 1.
Figure 3:
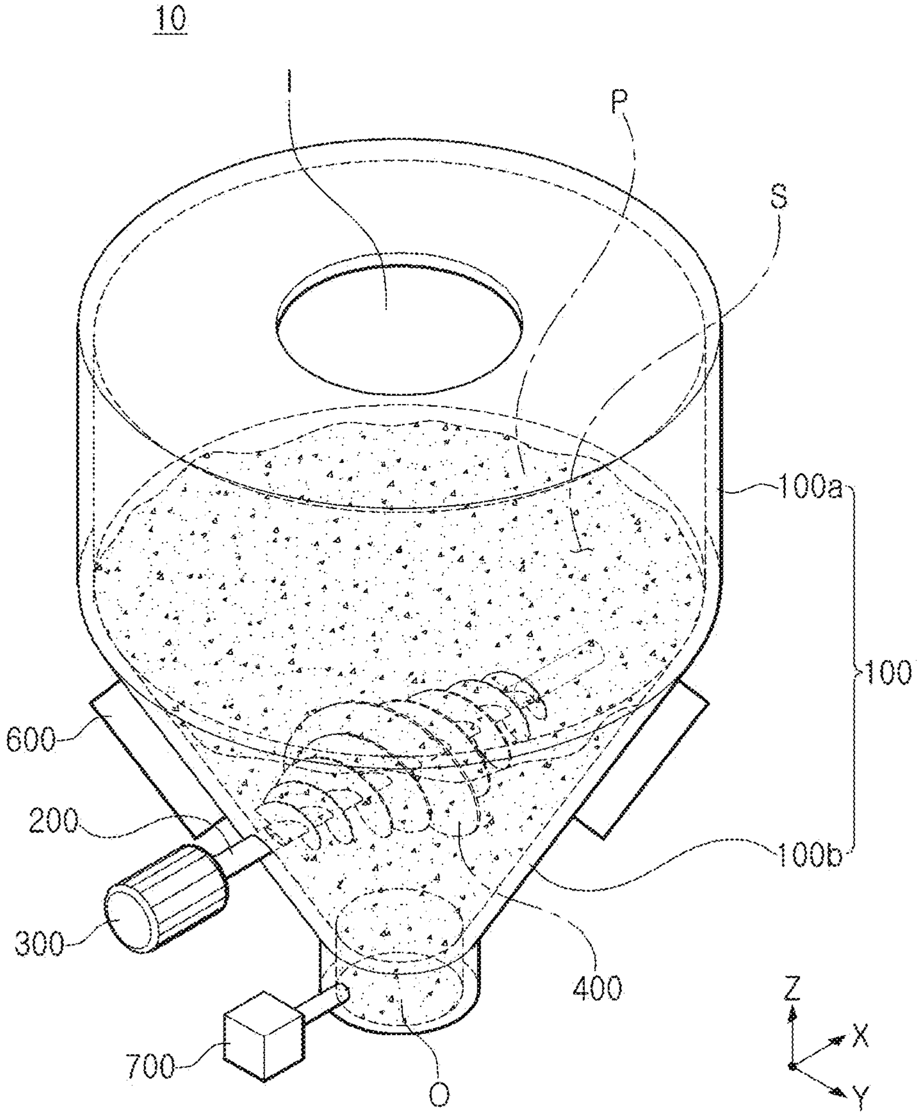
FIG. 3 is a perspective view illustrating a state in which powder is accommodated in the apparatus for discharging powder of a secondary battery of FIG. 1.
Figure 4:
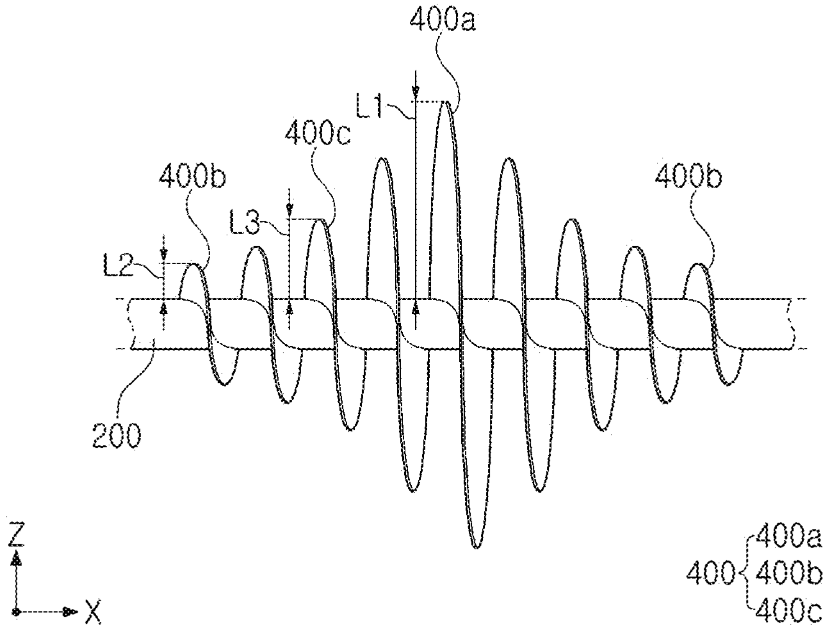
FIG. 4 is a diagram illustrating a spiral blade illustrated in FIG. 1.
Figure 5:
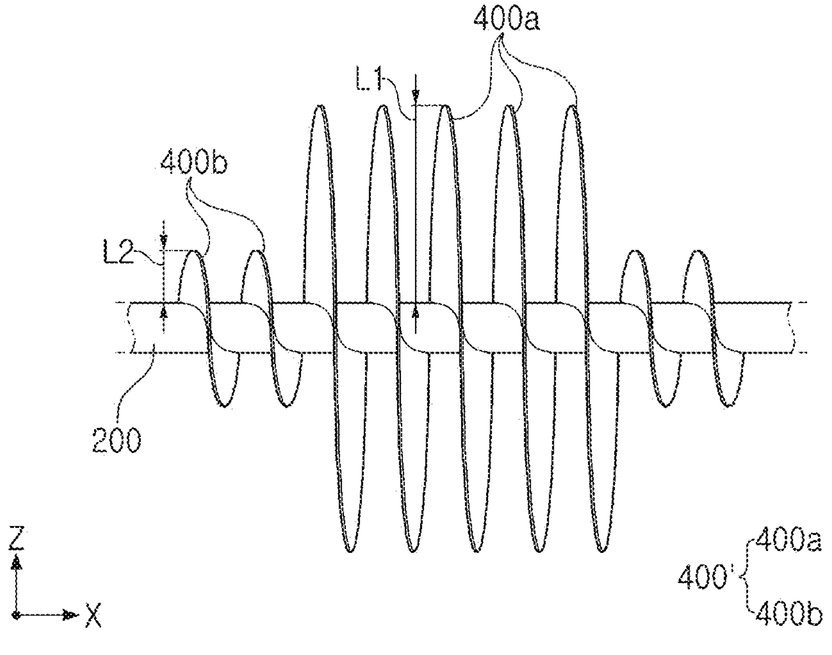
FIG. 5 is a modified example of the spiral blade illustrated in FIG. 4.

FIG. 1 is a perspective view of an apparatus for discharging powder of a secondary battery according to an embodiment of the present disclosure. FIG. 2 is a cross-sectional view taken along line I-I' of FIG. 1. FIG. 3 is a perspective view illustrating a state in which powder is accommodated in the apparatus for discharging powder of a secondary battery of FIG. 1. FIG. 4 is a diagram illustrating a spiral blade illustrated in FIG. 1. FIG. 5 is a modified example of the spiral blade illustrated in FIG. 4. In FIG. 2, a vibration unit is omitted for clear illustration of a drive shaft and a hopper.

First, referring to FIGS. 1 to 3, an apparatus 10 for discharging powder of a secondary battery according to an embodiment of the present disclosure may include a hopper 100, a drive shaft 200, a drive motor 300, and a spiral blade 400.

The hopper 100 may include an upper surface **100*a* in which an inlet I is formed and a lower surface 100*b* in which a discharge port O is formed. For example, the upper surface 100*a* of the hopper may have a cylindrical shape, and a portion of the lower surface 100*b*** of the hopper may have a cone shape having a cross-sectional area narrowing downwardly.

An accommodating space S in which powder P may be accommodated may be formed inside the upper surface **100*a* of the hopper and the lower surface 100*b* of the hopper. The hopper 100** may protect and store the powder P accommodated therein from an external environment. The powder P may be carbon powder used as a negative electrode active material for secondary batteries, and the carbon powder may be artificial graphite or natural graphite. However, without being limited thereto, slurry for secondary batteries, instead of the powder P, may be accommodated in the accommodating space S.

The inlet I may be formed in the upper surface **100*a* of the hopper. As an example, the inlet I may be formed at the top of the upper surface and may have a circular cross-section. The powder P may be introduced into the apparatus 10 for discharging powder of a secondary battery through the inlet I formed in the upper surface 100*a*** of the hopper.

An inclined portion may be formed on the lower surface **100*b* of the hopper. For example, an inclined portion may be formed so that a cross-sectional area decreases toward the bottom of the hopper 100. The powder P accommodated in the accommodating space S of the hopper 100** may move downwardly along the inclined portion.

A nozzle (not illustrated) injecting air into the hopper may be additionally disposed on the lower surface **100*b*** of the hopper. The nozzle may be disposed in the inclined portion, and the nozzle may inject air into the powder P stacked on the inclined portion. The powder P stacked on the inclined portion may not cluster due to the injected air.

The discharge port O may be formed at the bottom of the hopper 100. The discharge port O may be formed in a lower portion of the inclined portion. For example, the discharge port O may be formed in the center of the bottom of the hopper 100 and have a circular cross-section. The powder P moving downwardly along the inclined portion may be discharged to the outside of the hopper 100 through the discharge port O.

A valve 700 that may be opened and closed may be connected to the discharge port O. When the valve 700 is opened, the powder P may be discharged externally through the discharge port O. When the valve 700 is closed, the powder P is not discharged externally from the discharge port O.

The apparatus 10 for discharging powder of a secondary battery according to an embodiment of the present disclosure may further include a vibration unit 600.

The vibration unit 600 may be in contact with the inclined portion and may transmit vibrations to the hopper 100. Specifically, the vibration unit 600 may apply vibrations to the inclined portion in contact therewith. Accordingly, vibrations may be transmitted to the powder P disposed on the inclined portion, and the powder P may move to the lower portion of the hopper 100 along the inclined portion without clustering.

Referring to FIGS. 1 and 3, two vibration units 600 are arranged to contact the inclined portion, but are not limited thereto. For example, more vibration units 600 may be disposed on the inclined surface, and the vibration units 600 may be disposed to surround a portion of the inclined portion.

At least a portion of the drive shaft 200 may be disposed inside the hopper 100. The drive shaft may be disposed to contact the inclined portion. As an example, the drive shaft 200 may extend in a first direction (an X-direction) and may be disposed to penetrate through the center of the inclined portion. However, without being limited thereto, and the drive shaft 200 may connect inner walls of the hopper 100 and may be formed of a shaft disposed inside the hopper 100.

The drive shaft 200 may be connected to the drive motor 300. The drive shaft 200 may rotate clockwise or counter-clockwise upon receiving driving force from the drive motor 300. The drive motor 300 may be disposed outside the hopper 100 and may be connected to one end of the drive shaft 200.

The spiral blade 400 may be connected to a circumferential surface of the drive shaft 200. The spiral blade 400 may be disposed inside the hopper 100. The spiral blade 400 has a spiral shape and may include a plurality of blades **400*a* and 400*b* with different radii. The plurality of blades 400*a* and 400*b* may be arranged in a direction, substantially perpendicular to the drive shaft 200. This may not mean that the plurality of blades 400*a* and 400*b* are arranged to be completely perpendicular to the drive shaft 200 but mean that the plurality of blades 400*a* and 400*b* are tilted at an angle in a direction, perpendicular to the drive shaft 200. For example, the plurality of blades 400*a* and 400*b*** may be arranged at an acute angle with respect to a third direction (a Z-direction).

When the drive shaft 200 rotates, the spiral blade 400 connected to the drive shaft 200 may also rotate. Since the drive shaft 200 may extend in the first direction (the X-direction), the spiral blade 400 may rotate about a first axis (the X-axis). The spiral blade 400 may stir the powder P disposed inside the hopper 100, while rotating about the first axis (the X-axis). The powder P may be moved to one end in the first direction (the X-direction) by the spiral blade 400. For example, the powder P may be moved to the inclined portion, and the powder P moved by the spiral blade 400 may move along the inclined portion.

Next, the spiral blade 400 according to an embodiment of the present disclosure is described with reference to FIGS. 1 to 4.

The spiral blade 400 may include a first blade **400*a* and a second blade 400*b* with different radii. The first blade 400*a* and the second blade 400*b* may be provided in a circular or oval shape. When the first blade 400*a* and the second blade 400*b* have an overall circular shape, a radius L1 of the first blade 400*a* and a radius L2 of the second blade 400*b* may be different. When the first blade 400*a* and the second blade 400*b*** have an overall oval shape, a semimajor axis of the first blade and a semimajor axis of the second blade may be different. However, for convenience of description, in this specification, a case in which the blade has an overall circular shape is described.

The first blade **400*a* may be disposed in the center of the spiral blade 400 and may be disposed in a position opposite to the discharge port O. For example, the first blade 400*a*** may be disposed in a position facing the discharge port O in the third direction (the Z-direction).

The second blade **400*b* may be disposed on at least one of both ends of the spiral blade 400. Since the spiral blade 400 may be disposed in the first direction (the X-direction) along the drive shaft 200, the second blade 400*b* may be disposed on at least one of both ends of the spiral blade 400 in the first direction (the X-direction). In addition, the second blade 400*b*** may be disposed on both sides in the first direction (the X-direction).

The second blade **400*b* may be disposed to be adjacent to the lower surface 100*b* of the hopper. If the second blade 400*b* contacts the lower surface 100*b* of the hopper, the second blade 400*b* may be damaged. This is the same as the first blade 400*a*. Accordingly, the spiral blade 400 including the first blade 400*a* and the second blade 400*b* may be disposed to be spaced apart from the internal surface of the hopper 100 so that a blade tip does not contact the internal surface of the hopper 100**.

The radius L1 of the first blade may be formed to have a size corresponding to a distance from the drive shaft 200 to the top of the discharge port O in the third direction (the Z-direction). Accordingly, the first blade **400*a* may stir the powder P accumulated top of the discharge port O. Meanwhile, the radius L2 of the second blade may be formed to have a size corresponding to a distance from the drive shaft 200 to which the second blade 400*b* is connected to the inclined portion in the third direction (the Z-direction). Accordingly, the second blade 400*b*** may stir the powder P near the inclined portion.

In an embodiment of the present disclosure, the discharge port O may be disposed to be lower than the inclined portion, so the radius L1 of the first blade may be greater than the radius L2 of the second blade. Specifically, the radius L1 of the first blade may be 1.5 times or more than the radius L2 of the second blade, and may preferably be formed to have a size of 2 or more times.

In an embodiment of the present disclosure, the spiral blade 400 may include a third blade **400*c* disposed between the first blade 400*a* and the second blade 400*b*. A radius L3 of the third blade may be smaller than the radius L1 of the first blade and may be larger than the radius L2 of the second blade. Referring to FIG. 4, the spiral blade 400 may include a plurality of blades between the first blade 400*a* and the second blade 400*b* in addition to the third blade 400*c*. The plurality of blades may each have different radii to correspond to the lower surface 100*b* of the hopper. For example, since the lower surface 100*b*** of the hopper includes an inclined portion, the radii of the plurality of blades may gradually increase and then decrease in the first direction (the X-direction) to correspond to the inclined portion.

Next, a modified example 400' of the spiral blade is described with reference to FIG. 5. The modified example 400' of the spiral blade illustrated in FIG. 5 may be disposed in the apparatus 10 for discharging powder of a secondary battery illustrated in FIGS. 1 and 2.

Referring to FIGS. 1, 2, and 5, the modified example of the spiral blade may include the first blade **400*a* and the second blade 400*b* with different radii, similar to the spiral blade 400 described above with reference to FIGS. 1 to 4**.

Specifically, the radius L1 of the first blade may be larger than the radius L2 of the second blade.

The spiral blade 400' may include a plurality of first blades 400*a* and a plurality of second blades 400*b*. For example, a plurality of first blades 400*a* may be disposed in a position opposite to the discharge port O, and a plurality of second blades 400*b* may be disposed on at least one of both ends of the spiral blade 400' in the first direction (the X-direction). That is, a plurality of first blades 400*a* may be disposed between the second blades 400*b*.

The plurality of first blades 400*a* may be arranged to oppose the discharge port O and may mainly stir the powder P stacked in the portion facing the discharge port O in the third direction (the Z-direction). The plurality of first blades 400*a* may be appropriately arranged to correspond to the size of the discharge port O.

In the apparatus for discharging powder of a secondary battery of the related art, powder was stacked in the portion of the hopper opposing the discharge port, so the powder clusters. When the powder clusters, the powder could not be discharged smoothly from the discharge port, and the speed at which powder was introduced into the mixing device slowed down or powder was not properly introduced into the powder mixing device.

However, according to an embodiment of the present disclosure, the powder P may move downwardly of the hopper 100 along the inclined portion and be stacked at the discharge port O, but here, the spiral blades 400 and 400' may rotate to prevent the powder P from being stacked at the discharge port O, and thus, the powder P may not cluster. In addition, the spiral blades 400 and 400', including a plurality of blades with different radii to correspond to the size of the hopper 100, may stir the powder P included in the accommodating space S of the hopper 100 as a whole. Accordingly, the powder P stacked near the discharge port O may be discharged smoothly.

Although the spiral blades 400 and 400' have been described through FIGS. 4 and 5, the shapes of the spiral blades 400 and 400' are not limited to the shapes illustrated in FIGS. 4 and 5. For example, the number of blades, the arrangement method of the blades, and the like may vary.

Figure 6:
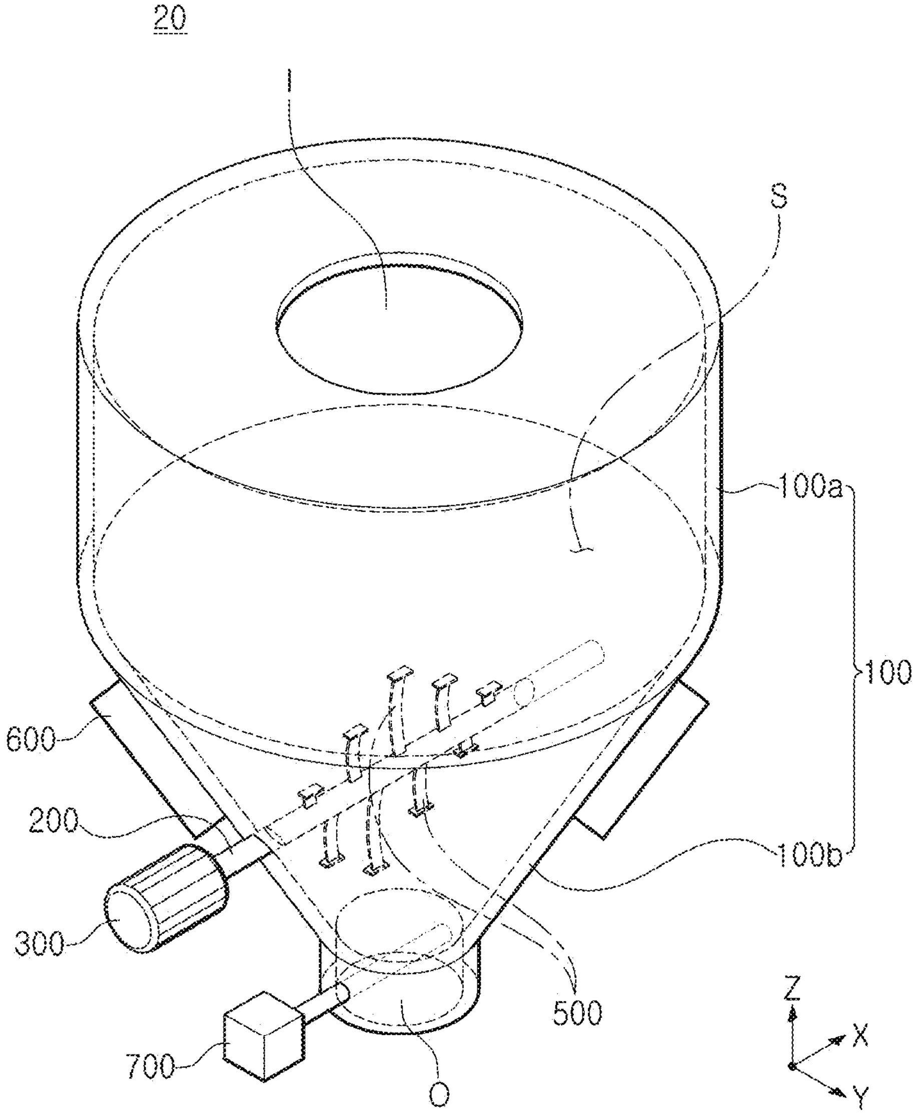
FIG. 6 is a perspective view of an apparatus for discharging powder of a secondary battery according to another embodiment of the present disclosure.
Figure 7:
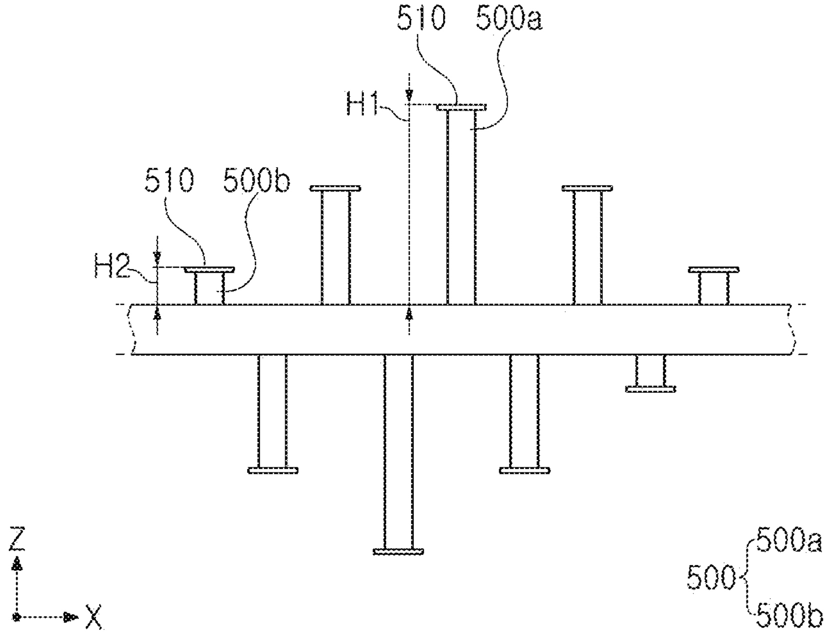
FIG. 7 is a diagram illustrating a screw member illustrated in FIG. 6.

FIG. 6 is a perspective view of an apparatus for discharging powder of a secondary battery according to another embodiment of the present disclosure. FIG. 7 is a diagram illustrating a screw member illustrated in FIG. 6.

Some of the components of an apparatus 20 for discharging the powder P of a secondary battery illustrated in FIG. 6 may be the same as the apparatus 10 for discharging the powder P of a secondary battery illustrated in FIG. 1. The apparatus 20 for discharging powder of a secondary battery according to another embodiment of the present disclosure may include a plurality of screw members 500 instead of the spiral blade 400 illustrated in FIG. 1.

Referring to FIGS. 6 and 7, the plurality of screw members 500 may be arranged to be connected to a circumferential surface of the drive shaft 200 and may have extend externally in a radial direction of the drive shaft 200. As an example, the plurality of screw members 500 may be formed to extend in a second direction (a Y-direction) but is not limited thereto. For example, the plurality of screw members 500 may be extend in different directions, and the method of forming the screw member 500 may vary.

The plurality of screw members 500 may rotate clockwise or counterclockwise with respect to the drive shaft 200. The plurality of screw members 500 may rotate about the first axis (the X-axis) to stir the powder to be disposed inside the hopper 100.

Each of the plurality of screw members 500 may have a flange portion 510 formed at one end. The flange portion 510 may expand a cross-sectional area of one end of the screw member 500. Therefore, the flange portion 510 may ensure that the powder P located away from the drive shaft 200 is properly stirred when the screw member 500 rotates. As an example, the flange portion 510 may have a shape extending in the first direction (the X-direction) and may be formed parallel to the drive shaft 200.

The plurality of screw members 500 may include a first screw member 500*a* formed in a position opposite to the discharge port O and a second screw member 500*b* disposed on at least one of both ends of the plurality of screw members 500 in the first direction (the X-direction). However, without being limited thereto, the plurality of screw members 500 may include only the first screw member 500*a* formed in the position opposite to the discharge port O. Accordingly, at least some of the plurality of screw members 500 may be disposed in the position opposite to the discharge port O.

Since the discharge port O may be disposed to be lower than the inclined portion, a length H1 of the first screw member may be formed to be longer than a length H2 of the second screw member. Accordingly, the first screw member 500*a* may stir the powder located on the upper side of the discharge port O as a whole.

A third screw member may be disposed between the first screw member 500*a* and the second screw member 500*b*. A length of the third screw member may be smaller than the length H1 of the first screw member and may be greater than the length H2 of the second screw member. Referring to FIGS. 6 and 7, a plurality of screw members may be included between the first screw member 500*a* and the second screw member 500*b*. The plurality of screw members 500 may each have different lengths to correspond to the lower surface 100*b* of the hopper. For example, since the lower surface 100*b* of the hopper includes the inclined portion, the lengths of the plurality of screw members may each be formed to correspond to the inclined portion.

Descriptions of the hopper 100, the drive shaft 200, the drive motor 300, the vibration unit 600, and the valve 700 are substituted with the above descriptions.

According to an embodiment of the present disclosure having the configuration described above, clustering of powder may be reduced.

According to an embodiment of the present disclosure having the configuration described above, powder may be smoothly discharged.

Only specific examples of implementations of certain embodiments are described. Variations, improvements and enhancements of the disclosed embodiments and other embodiments may be made based on the disclosure of this patent document.

What is claimed is:

1. An apparatus for discharging powder of a secondary battery, the apparatus comprising:

a hopper having an accommodating space in which powder is accommodated and a discharge port through which the powder is discharged;

a drive shaft at least partially disposed inside the hopper and having a shape extending in a first direction;

a drive motor connected to the drive shaft and rotating the drive shaft; and a spiral blade connected to a circumferential surface of the drive shaft, wherein the spiral blade includes a first blade, a second blade and a third blade having different radii from each other, wherein the first blade is disposed in a position opposite the discharge port, the second blade is disposed on at least one of both ends of the spiral blade in the first direction, and the third blade is disposed between the first blade and the second blade, wherein a radius of the first blade is greater than a radius of the second blade, and wherein a radius of the third blade is smaller than the radius of the first blade and larger than the radius of the second blade.

2. The apparatus of claim 1, wherein the spiral blade is disposed to be spaced apart from an internal surface of the hopper so that a blade tip does not contact the internal surface of the hopper.

3. An apparatus for discharging powder of a secondary battery, the apparatus comprising:

a hopper having an accommodating space in which powder is accommodated and a discharge port through which the powder is discharged;

a drive shaft at least partially disposed inside the hopper and having a shape extending in a first direction;

a drive motor connected to the drive shaft and rotating the drive shaft; and a spiral blade connected to a circumferential surface of the drive shaft, wherein the spiral blade includes a first blade and a second blade having different radii, wherein a radius of the first blade is greater than a radius of the second blade, wherein the first blade is disposed in a position opposite the discharge port, and the second blade is disposed on at least one of both ends of the spiral blade in the first direction, wherein the first blade and the second blade are provided in plural, and wherein the first blade is disposed between the second blades.

4. The apparatus of claim 3, wherein an inclined portion is formed on a lower surface of the hopper, and the discharge port is formed in a lower portion of the inclined portion.

5. The apparatus of claim 4, wherein the drive shaft is in contact with the inclined portion.

6. The apparatus of claim 5, wherein the radius of the first blade is equal to twice or more the radius of the second blade.

7. The apparatus of claim 4, further comprising a vibration unit contacting the inclined portion and transmitting vibrations to the hopper.

8. The apparatus of claim 3, wherein a valve which is opened and closed is connected to the discharge port.

9. The apparatus of claim 3, wherein the spiral blade is disposed to be spaced apart from an internal surface of the hopper so that a blade tip does not contact the internal surface of the hopper.

10. An apparatus for discharging powder of a secondary battery, the apparatus comprising:

a hopper having an accommodating space in which powder is accommodated and a discharge port through which the powder is discharged, the discharge port being formed at a bottom;

a drive shaft at least partially disposed inside the hopper and having a shape extending in a first direction;

a drive motor connected to the drive shaft and rotating the drive shaft; and a plurality of screw members connected to a circumferential surface of the drive shaft and extending outwardly in a radial direction of the drive shaft, wherein at least a portion of the plurality of screw members are disposed in a position opposite to the discharge port, and the plurality of screw members include a surface parallel to an axis of the drive shaft.

11. The apparatus of claim 10, wherein the plurality of screw members each include a flange portion formed at one end thereof.

12. The apparatus of claim 11, wherein the flange portion has a shape extending in the first direction.

13. The apparatus of claim 10, wherein the plurality of screw members include a first screw member disposed in the position opposite to the discharge port and a second screw member disposed on at least one of both ends of the plurality of screw members in the first direction, and a length of the first screw member is greater than a length of the second screw member.

* * * * *